May 12, 1936.　　　　C. S. ASH　　　　2,040,541
SKELETON VEHICLE WHEEL
Filed May 8, 1929　　　　4 Sheets-Sheet 1
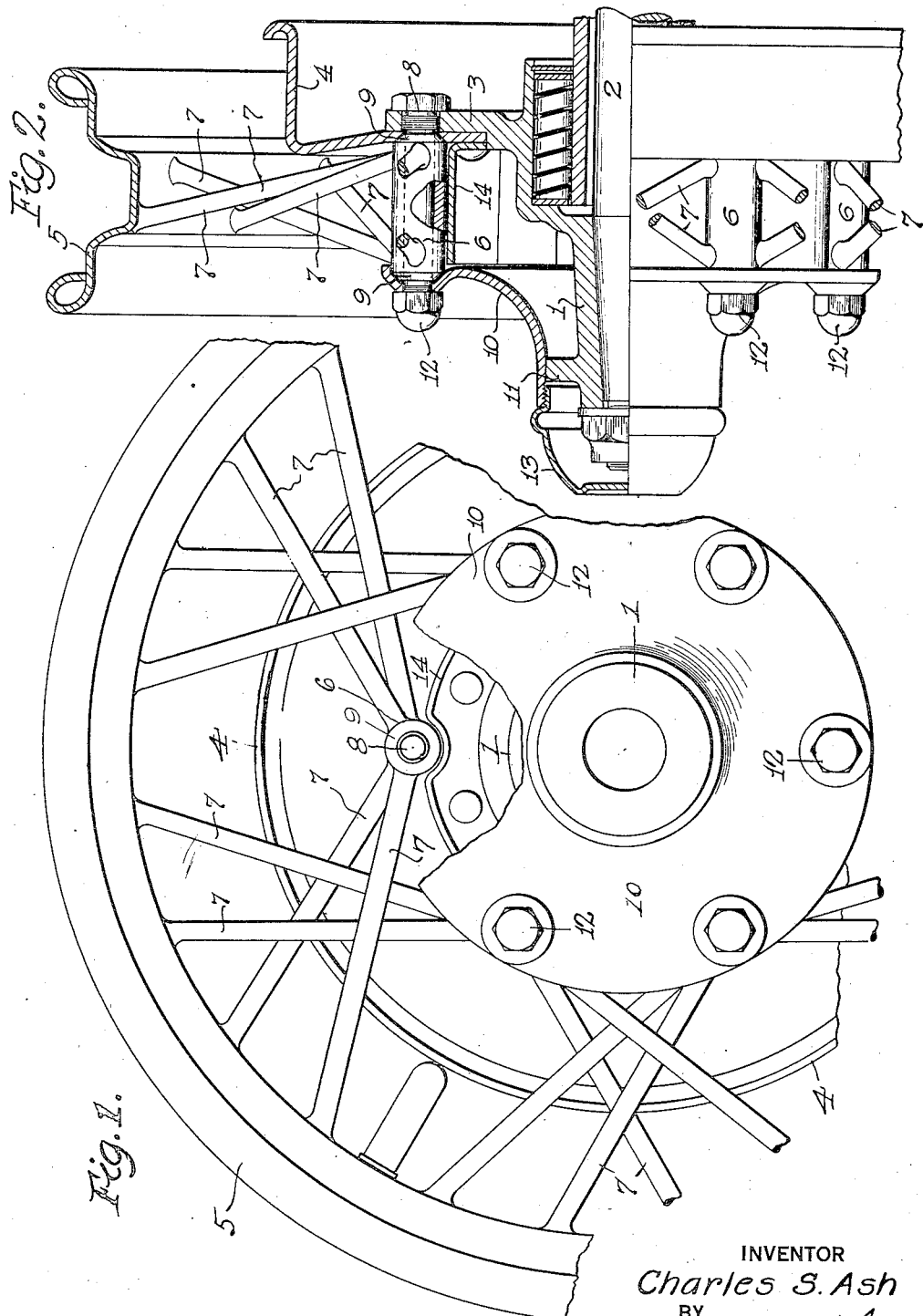
INVENTOR
*Charles S. Ash*
BY
ATTORNEY

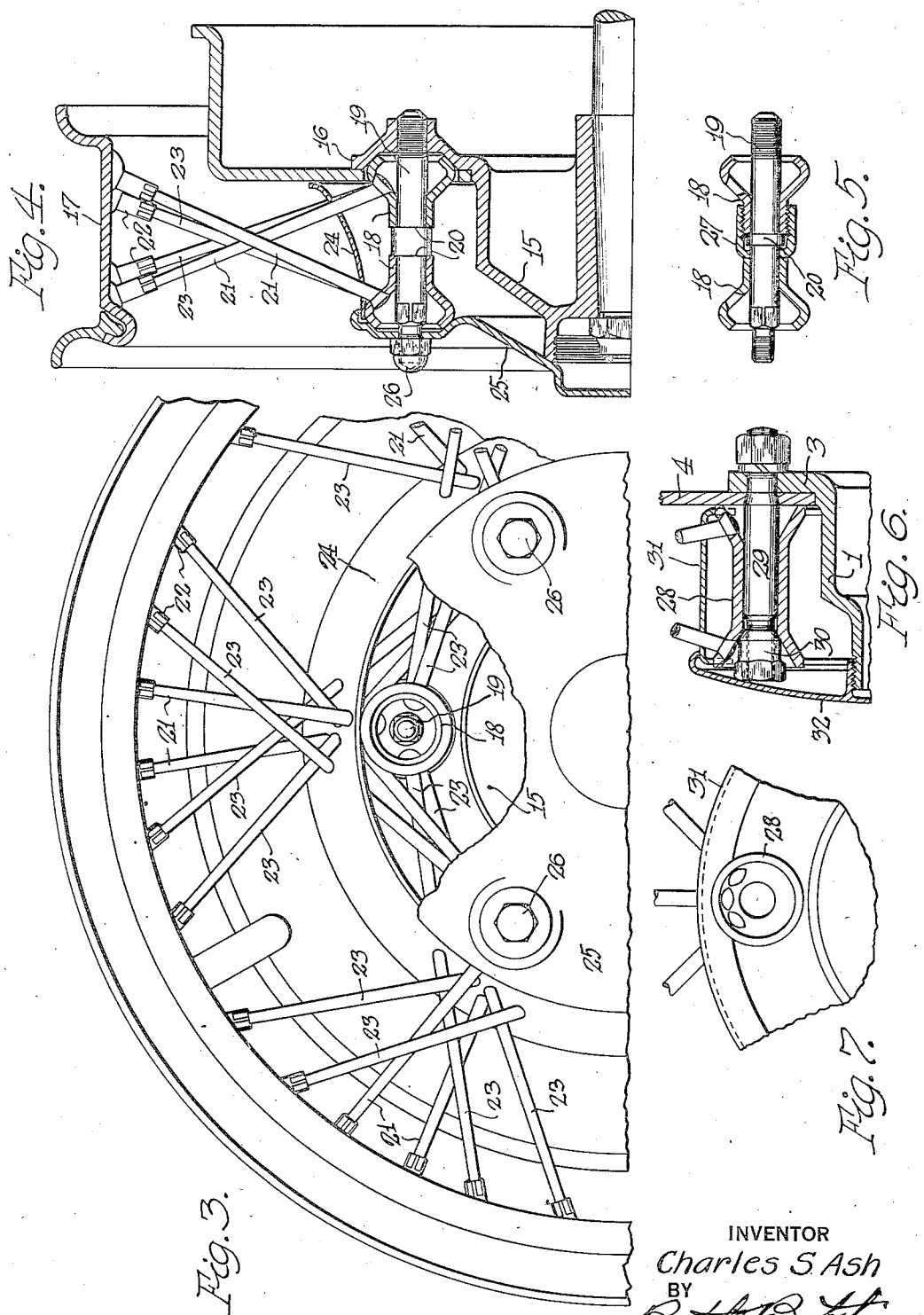

May 12, 1936.  C. S. ASH  2,040,541
SKELETON VEHICLE WHEEL
Filed May 8, 1929  4 Sheets-Sheet 3
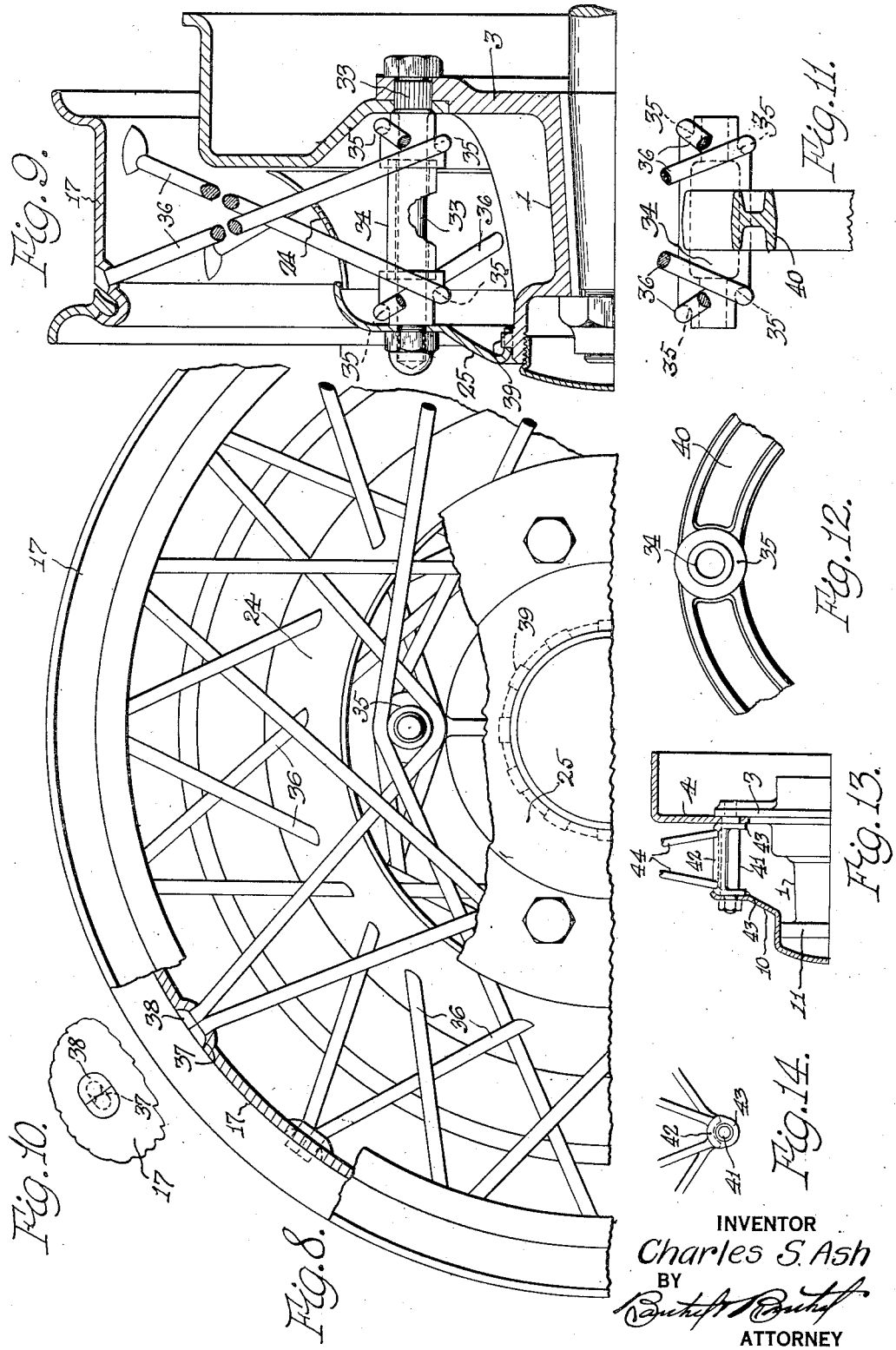
INVENTOR
Charles S. Ash
BY
ATTORNEY May 12, 1936.  C. S. ASH  2,040,541
SKELETON VEHICLE WHEEL
Filed May 8, 1929   4 Sheets-Sheet 4

INVENTOR
Charles S. Ash
BY
ATTORNEY

Patented May 12, 1936

2,040,541

UNITED STATES PATENT OFFICE 2,040,541

SKELETON VEHICLE WHEEL

Charles S. Ash, Royal Oak, Mich., assignor, by mesne assignments, to The Kelsey-Hayes Wheel Company, Detroit, Mich., a corporation of Delaware Application May 8, 1929, Serial No. 361,317

4 Claims. (Cl. 301—55)

This invention relates to a motor-vehicle wheel construction, and its object is to provide a wire wheel of the "demountable at the hub" type in which the usual outer hub is dispensed with and the arrangement and construction is such that all of the wheels are interchangeable and either wood or disk wheels may be substituted therefor and mounted upon the same hub or hubs.

A further object is to provide a wire wheel of the "demountable at the hub" type wherein the mounting means carried by the wheel replaces the ordinary outer hub to secure the wheel in place and when so secured, becomes a rigid structure, said securing means taking the load, driving and braking strains.

A further object is to provide a wire wheel structure of the "bolted-on" type which presents the appearance of a wheel having a large outer hub and without the necessity for such a hub shell into which to connect the spokes, and the means to receive the bolts also serves as means to which the spokes are attached, said means comprising members for spaced mounting and for the attachment to each, of a group of spokes, either as compression or tension members or both.

It is also an object to provide a construction wherein a shield excludes the dirt, forms a finish for the central portion of the wheel, concealing the wheel attaching means, and serves to position the spokes in assembling the wheel. A further object is to provide, in connection with a series of concentrically arranged attaching or mounting members, a spoke arrangement whereby a tension or compression or a combined tension and compression wheel may be erected, the lacing and securing of the spokes in place facilitated and the construction simplified and cost of manufacture reduced.

It is also an object to provide certain other new and useful features in the combination, construction and arrangement, all as hereinafter more fully set forth.

With the above and other ends in view, the invention consists in the matters hereinafter set forth and more particularly pointed out in the appended claims, reference being had to the accompanying drawings, in which:—

Figure 1 is a side elevation of a wheel illustrative of an embodiment of the present invention, portions of the figure being broken away to reduce the area of the figure and disclose parts of the construction;

Fig. 2 is a vertical section through the upper half of Fig. 1, the lower portion being partially in elevation;

Fig. 3 is a side elevation of a portion of a wheel illustrating a modified construction;

Fig. 4 is a vertical section through Fig. 3;

Fig. 5 is a sectional detail of a modified form of the mounting member;

Fig. 6 is a sectional detail of a hub portion of a wheel showing a further modified construction;

Fig. 7 is an end elevation of Fig. 6 with the end cap removed;

Fig. 8 is a side elevation of a portion of a wheel embodying a further modified construction and showing parts broken away and in section;

Fig. 9 is a vertical section through Fig. 8;

Fig. 10 is a detail of the spoke ends and the manner in which they are seated in a rim;

Fig. 11 is a detail of a modified construction of the mounting member showing the same in side elevation and a connecting ring in section;

Fig. 12 is an end elevation of Fig. 11 with the spokes omitted;

Fig. 13 is a vertical longitudinal section through a wheel illustrative of a further modified construction;

Fig. 14 is a detail of a mounting member of the wheel shown in Fig. 13 and showing said member in end elevation;

Figures 15, 16:
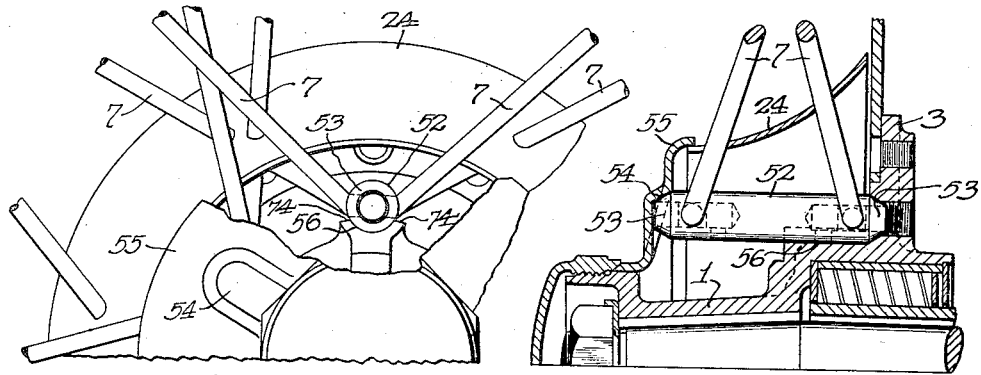
Fig. 15 is an end elevation of a portion of a wheel and hub illustrative of a further modification.
Fig. 16 is a vertical longitudinal section through Fig. 15.

Wire wheels as ordinarily constructed are provided with a hub shell or what is known as an outer hub which is adapted to fit over the inner hub or the hub which is mounted upon the axle or stub shaft of the axle, the spokes of the wheel being laced into the hub shell for connecting the rim thereto, and suitable means is provided for securing the hub shell in place upon the inner hub detachably, so that the wheel including the rim and shell with connecting wire spokes, may be readily demounted, as a whole, from the inner or permanent hub. The hub shell of such a wheel, according to the usual practice, is detachably secured in place either by a hub cap or outer member for engaging the end of the shell or by bolting the shell by means of a series of bolts to an outstanding flange on the inner hub.

In the several constructions as shown in the accompanying drawings, the outer shell or hub is dispensed with and a series of mounting members is provided for mounting the wheel which includes these mounting members, a rim and spokes connecting the members and rim, the mounting members forming a zone of detachable attachment of the wheel to the hub and also providing places of anchorage for the inner ends of the spokes, these spokes being arranged in groups with each group connected to a single mounting member. The wheel proper or demountable structure is therefore devoid of a hub and this wheel structure does not become a wheel in the sense that it is of sufficient rigidity to take load strains, until after it is secured in operative position upon the axle hub.

In Figs. 1 and 2 of the drawings a construction is shown wherein 1 indicates a hub of any suitable form and construction adapted to be secured to the end of the axle drive shaft 2 for imparting rotation to the wheel, or this hub may be of the usual construction for mounting upon the pivoted stub of the front axle of a motor vehicle. In either case, the hub will be provided with an outstanding flange 3 which is usually provided for the attachment thereto of a brake drum 4. In the present instance this flange 3 forms a support or place of attachment for the demountable wire wheel which wheel includes a rim 5 of any suitable form or construction for the mounting thereon of the usual tire.

A series of tubular mounting members 6 is provided, said members being arranged in spaced apart relation around the axis of the hub concentric therewith and the spokes 7 forming the web of the wheel are arranged in groups, as shown in Figs. 1 and 2, each group consisting of four spokes connected at their inner ends to one of the mounting members 6 and extending radially outward therefrom and connected to the rim 5 at their outer ends. The spokes of each group as shown in the construction depicted in Figs. 1 and 2, are preferably welded at their inner ends to the outer cylindrical surface of one of the tubular mounting members 6 and extend outwardly therefrom toward the rim in divergent relation, two spokes of the group being welded to the mounting member adjacent one end and the other two spokes of the group being welded to said member adjacent its opposite end with the spokes at one end crossing those at the other end and welded at their outer ends to the rim, thus bracing the wheel against lateral strains and the driving and load strains are taken by these spokes by so arranging them that the spokes projecting from each side of the mounting members will cross two of the spokes of an adjacent group.

With this arrangement of the spokes, each spoke should be of a size and strength to take strains in both compression and tension and when so welded in connection between the mounting members and rim, said spokes will serve to hold these mounting members in position so that this skeleton wheel may be readily mounted in operative position upon the mounting flange 3 of the hub or other inner member for rotation upon the axle. This skeleton wheel, when demounted, has but little rigidity and practically no load carrying strength, due to the fact that this demountable structure is lacking any rigid continuous inner member to which the spokes are attached at their inner ends, but when said skeleton wheel is mounted securely in place upon the axle hub or other suitable support, it becomes a very strong and rigid wheel adapted to withstand driving, load and braking strains, and to so detachably secure this skeleton wheel in operative position, the flange 3 is provided with a series of bolts 8 adapted to extend through the tubular mounting members 6, and as shown in Fig. 2, the ends of each mounting member are beveled or tapered, as at 9, to engage a seat formed in the flange 3 around the opening for the bolts 8 to fit one end of the mounting member 6, and slipped over the outer end of the hub 1 is a shield 10 which is provided with a series of openings through which the outer ends of the bolts 8 extend. The shield 10 fits over and rests upon an outstanding annular flange 11 on the hub formed to fit closely within the shield to form a support therefor so that when the nuts 12 are applied to the bolts 8 and turned up firmly against the shield 10, the outer ends of the several mounting members 6 are supported by the engagement of the tapered end 9 of each member with a suitable seat formed in the shield 10. The several mounting members 6 are therefore rigidly and detachably secured between the flange 3 and the shield 10 and accurately positioned thereby.

The skeleton wheel may be quickly detached by unscrewing the cap 13 from connection with the outer end of the shield 10, removing the nuts 12 and then slipping the shield from engagement with the bolts, the skeleton wheel being thus released so that it may be readily withdrawn from engagement with the securing bolts 12. In mounting the wheel, the skeleton wheel is guided into place so that the bolts 8 will readily enter and pass through the several mounting members, by providing an inner flange 14 secured to the flange 3 and extending outwardly therefrom and just within the circle of the several mounting members 6. The skeleton wheel including the rim and the series of tubular mounting members 6 with the spokes connecting said members and rim, may therefore be readily positioned in mounting the wheel with the mounting members engaged over the bolts 8, the flange 14 forming a guide for these mounting members in placing the skeleton wheel in operative connection with the axle hub by sleeving the mounting members 6 over the several bolts 8, said flange also forming a shield or finish and may be so arranged as to take driving and braking strains.

In Figs. 3 and 4 of the drawings a modification of the construction is shown, this modification consisting principally in the construction of the mounting members and in the lacing of the spokes. As in the above described construction, any suitable form of axle hub 15 is provided, said hub being formed with an outstanding radial flange 16 for the attachment of the skeleton wheel thereto, said wheel comprising a rim 17 and spokes connecting the rim with the series of spaced apart mounting members, each mounting member comprising two sleeves 18 each having an enlarged or cup-shaped outer end portion and an inner end portion of a diameter to fit the mounting or securing bolts 19 which are secured in the openings in the flange 16 and extend laterally therefrom.

Each bolt intermediate its ends is formed with a portion of greater diameter forming shoulders 20 against which the inner ends of the sleeves 18 abut. The spokes are arranged in groups, six spokes being attached to each of the mounting members, two of these spokes 21 extending substantially radially outward of the wheel from the mounting member, one of each of said spokes being threaded through an opening in the enlarged or cup-shaped end of each sleeve 18, the spokes being provided with heads to engage the sleeve at their inner ends and at their outer ends are connected to the rim 17 in any suitable manner as by the usual nipples 22. The other spokes 23 of each group extend laterally from the mounting member to which they are attached by being threaded through openings in the sleeves 18 of said members, and, therefore, there are two spokes which extend radially outward from each mounting member and two other pairs of spokes extending in opposite directions from the member and exerting a pull thereon in opposite directions. The wheel mounting members 18 are thus suspended, the spokes being placed under tension in the assembly of the wheel to hold each mounting member in a fixed position. By threading the spokes through the enlarged or cupped ends of the sleeves 18, these spokes of each pair may be readily positioned in the wheel crossing each other and thus bracing the wheel against lateral strains. The cupped or enlarged end of the inner sleeve seats within a seat or depression in the flange 16 and thus when the wheel is mounted and the bolt 19 turned up, each of the mounting members is drawn into firm contact with the flange and is rigidly attached thereto and supported thereby, the mounting members taking the driving load and braking strains.

To form a finish for the central portion of the wheel, when in mounted position, and to keep out the dust and dirt which would otherwise collect around the mounting members, a thin sheet metal annular shield 24 is provided, this shield being formed with openings through which the spokes extend, said spokes being threaded through these openings in the shield during the assembling of the wheel, and thus said shield also provides means for positioning and holding the several spokes during assembly. A large hub cap or disk 25 is also provided, said cap being formed with a series of openings through which the outer ends of the bolts 19 extend so that when the nuts 26 are applied to the outer ends of these bolts, the cap will be drawn into firm contact with the outer ends of the several mounting members and close the outer end of the shield 24. When mounted, the wheel therefore has the appearance of a wire wheel as ordinarily constructed having a large hub, the shield 24 and cap 25 giving this appearance to the wheel and also excluding the mud and dirt from the central portion of the wheel.

In Fig. 5 is shown a construction of hub mounting member similar to that shown in Fig. 4 but slightly modified so that the two sleeves 18 may be adjusted toward and from each other in order to spread the inner ends of the spokes apart and thereby put these spokes under tension. To effect such adjustment a tubular member 27 is sleeved upon the bolt 19 with an end portion of this tubular member engaging the end of the outer sleeve 18 and with said member internally screw-threaded to engage an external screw thread formed on the opposite or inner sleeve 18, the inner end of which sleeve abuts the collar or enlarged portion 20 formed on the bolt. By turning the tubular member 27 relative to the sleeve with which it is in screw-threaded engagement, said tubular member is adjusted longitudinally of the bolt and toward the opposite or outer sleeve 18, thus spreading the sleeves apart longitudinally of the bolt and placing the spokes under tension.

In the constructions shown in Figs. 6 and 7, the mounting members are in the form of a single tube 28 the ends of which are flared or expanded so that the several spokes may be threaded through openings in the expanded ends of this sleeve. The inner end of each sleeve 28 seats against the side of the flange 3 or the surface of the drum wall 4 secured thereto and is held in place by a bolt 29 secured at one end within an opening in the flange and passing through the sleeve 28, its outer end being reduced in diameter and screw-threaded to receive a nut 30 having a tapered inner end to seat within the flared end of the sleeve 28 so that when the nut is turned up on the bolt it seats firmly within the end of the tube or mounting member and forces this member into firm end seating contact with the hub flange which forms the sole support and place of attachment for the several mounting members. If found desirable, this construction may also be provided with an annular shell 31 similar to the shell 24 and a cap 32 may be provided to screw upon the outer end of the hub 1 and into engagement with the several nuts 30 with the periphery of the cap extending over the edge of the shield 31. The central portion of the wheel is thus shielded against dust and dirt, the shield 31 forming positioning means for the spokes in the assembly of the wheel, and the cap 32 serving to close the outer end of the shield and also to form a lock for the nuts 30 which hold the mounting members in place upon the bolts.

In Figs. 8 and 9 a further modified construction of wheel is shown, the arrangement of the spokes being such as to provide a suspension wheel. As in the other constructions, any suitable form of hub 1 having an outstanding flange 3 may be provided, said flange forming a support for a series of bolts 33 which are firmly anchored at one end within openings in the flange 3 and extend horizontally therefrom parallel with the axis of rotation of the wheel. The skeleton wheel structure which comprises the rim 17 connected by spokes with the several mounting members each of which is in the form of a cylindrical sleeve 34 adapted to fit over or be sleeved upon the bolts 33, each sleeve 34 being formed with end portions enlarged in diameter and formed with external seats 35 for the intermediate portions of the wire spokes 36 each of which is connected in any suitable manner at both of its ends to the wheel rim. The several spokes are therefore of the hair-pin type, that is, they have a bearing or portion intermediate their ends which engages over or beneath the several mounting members, according to the position in which their outer ends are connected to the rim relative to the position of the mounting member. Two of these continuous spokes engage each end of the mounting members, one spoke passing beneath said end and the other over it and therefore each end of each mounting member is suspended by a pair of spokes from the wheel rim, and to give to the wheel lateral rigidity, the outer ends of these spokes are crossed transversely of the wheel, the spokes taking the load driving and braking strains by arranging them with one spoke at each end of the mounting member extended beneath the mounting member and attached at its ends to the rim outwardly of the wheel from said member and the other spoke of the pair being extended over the mounting member with its ends attached to the rim of the wheel inwardly in a horizontal plane passing through the axis of the mounting member, the several spokes engaging the several mounting members being interlaced and arranged to cross one another so that all spokes are under tension.

Their interlacing is such that the outer ends of certain spokes of one group meet the ends of the same spokes of another group and therefore these meeting ends may be passed through a single opening in the rim of the wheel, as shown at 37, and these ends upset within a depression in the rim at said opening, each head 38 thus formed on the end of each spoke filling one half of the depression, as shown in Fig. 10. This construction of wheel may also be provided with a flared annular shield similar to the shield 24 and through openings in which the several spokes extend, the shield excluding the mud and dirt from the hub portion of the wheel when in operative position, and mounted upon the end of the axle hub 1 is a cap similar to the cap 25 which is provided with openings through which the outer ends of the bolts 33 project, to be engaged by the nuts on the ends of the bolts, which thus hold the cap firmly in place and the several mounting members sleeved upon the bolts. If found desirable, lugs 39 may be provided on the hub to engage notches in the cap 25 and prevent relative rotation between hub and cap, thus accurately locating the openings in the cap relative to the bolts 33 so that the wheel may be quickly mounted.

In Fig. 11 the mounting member or sleeve 34 is shown in detail, said sleeve being modified in its construction in that the several sleeves of the mounting are rigidly connected together by an integral ring 40 which is concentric with the axis of the rotation of the wheel and assists in the mounting of the wheel upon the stud bolts 33.

In Fig. 13 a further modified construction is shown in the form of several mounting members, the construction of these mounting members being such as to greatly simplify the construction of the wheel. As before, these several spaced-apart mounting members are mounted upon bolts 41 rigidly anchored at one end to the outstanding flange 3 on the hub 1, each mounting member comprising a strip of metal of segmental form in cross section, as at 42, and having downturned end ears 43 provided with openings through which the bolts 41 extend. The several spokes 44 which may be arranged in any suitable manner, are preferably welded at their inner ends to the segmental portion 42 of the mounting members and extend radially outward therefrom. As in the construction shown in Fig. 2, a cap or shield member 10 fits over a flange 11 on the hub and is provided with a series of openings through which the several bolts 41 extend with the nuts on the outer ends of the bolts engaging the cap and securely holding it in firm contact with the outer ends of the several mounting members. The cap thus serves to assist in supporting the outer ends of the bolts 41 and at the same time hold the mounting members in place upon the bolts and the wheel rigidly mounted in operative position.

In Figs. 15 and 16 a construction of wheel is shown which is quite similar to the construction shown in Figs. 1 and 2, the main difference being in that the mounting members instead of being of tubular form, are formed from solid stock, each comprising a cylindrical length of rod, as shown at 52, the ends of each of these cylindrical members being tapered, as at 53, so that all of the mounting members may seat firmly within tapered seats formed at one end of openings in the flange 3 on the hub 1, the opposite tapered end being adapted to be engaged by a correspondingly formed recess 54 in a cap 55 which is detachably secured upon the outer end of the hub. The hub 1 is also formed with a series of seats 56 within which the several mounting members 52 seat at their inner sides. When the cap 55 is secured upon the end of the hub it forces the skeleton wheel toward the flange 3 and brings the inner ends of the mounting members 52 into firm end seating engagement with their seats on said flange, and also into firm seating engagement with the seats 56, the tapered ends of the several mounting members engaging the tapered seats in the flange and cap serving to draw inwardly on the spokes 7, the outer ends of which are rigidly secured in any suitable manner to the wheel rim (not shown). If found desirable, this construction may be provided with an annular shield similar to the shield 24 and for the same purpose.

Figure 17:
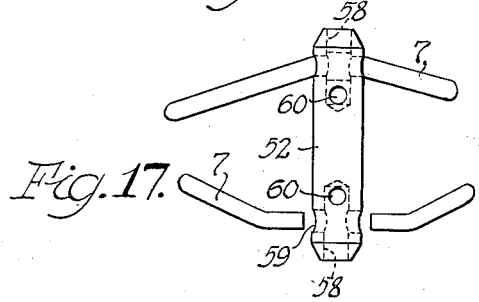
Fig. 17 is an elevation of a mounting member shown in Figs. 15 and 16 and illustrative of the manner in which spokes are welded in connection therewith.

To facilitate the welding of the inner ends of the spokes 7 to the mounting members 52, each of said cylindrical mounting members is bored inwardly from each end, as at 58, and openings 59 are formed laterally in these members to receive the ends of the spokes. Other openings 60 form vents for the inner ends of the bores 58 so that when the ends of the spokes are inserted in the openings 59 and are welded therein by an electric welding operation and pressure, the flash formed at the inner abutting ends of the spokes is received in the bores 58 and remains therein, the gases passing off through the openings 60 and the outer open ends of the bores 58. It is therefore unnecessary to remove the flash and as this flash remains within the bore on the ends of the spokes, it assists in securely holding the spokes in place. This particular construction of mounting members is illustrated in the detail shown in Fig. 17.

Figures 19, 20:
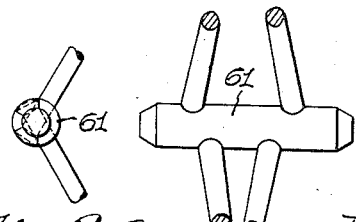
Fig. 19 is a detail view of the mounting member shown in Fig. 18 and illustrative of the manner in which spokes are connected to said member.
Fig. 20 is an end elevation of Fig. 19.
Figure 18:
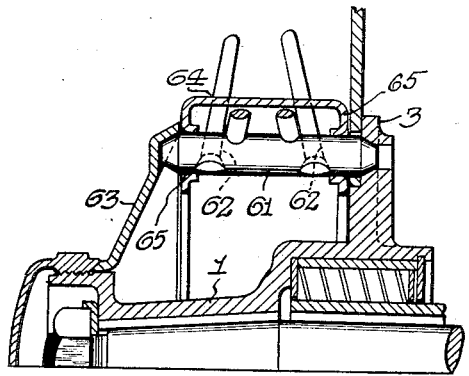
Fig. 18 is a section similar to that of Fig. 16 and showing a slightly modified construction.

The construction shown in Fig. 18 is substantially the same as that shown in Fig. 16, the principal difference consisting in the manner in which the inner ends of the spokes are secured to the mounting members and in the direction in which these spokes extend outwardly from the several mounting members. The mounting member 61 shown in Figs. 18, 19, and 20 consists of a single body tapered at its ends, but instead of being bored axially, as in the construction shown in Fig. 16, it is formed with transverse openings to receive the ends of the spokes, said openings 62 extending completely through the cylinder and the ends of the spokes being riveted down at the opposite side from that at which they are entered. These openings are so arranged in staggered relation that the spokes will extend into proper outwardly divergent relation for proper connection to the rim to give the desired support thereto.

As in Fig. 16, a cap 63 is secured upon the end of the hub 1 and engages the outer tapered ends of the members 61. An annular shield 64 may also be provided, said shield being similar to the shield shown in Fig. 6 and provided with openings through which the several spokes are threaded. This shield 64 is modified from the construction shown in Fig. 6 in that it is of channel shape in cross section, the end flanges 65 being provided with openings to receive the several mounting members 61.

Each of the several constructions shown in the drawings includes a rim connected to a plurality of mounting members by spokes, forming a hubless wheel for demountable mounting upon a permanent or non-demountable hub through the medium of said mounting members, whereby, when so mounted, said hubless, non-rigid wheel is made rigid and capable of withstanding load, driving and breaking strains in use. I do not, therefore, limit myself to structural details, but contemplate the inclusion, in combination, of the elements or their mechanical equivalents, as set forth in the appended claims, arranged to produce a hubless wheel of the character described.

Having thus fully described my invention, what I claim is:—

1. A wheel comprising a rim, a plurality of tubular mounting members extending substantially parallel with the wheel axis, each mounting member comprising a pair of tubular parts in axial alignment, spokes connecting said rim and mounting members, and bolts extending through said mounting members for securing the same to a hub member, said bolts being provided with shoulders intermediate their ends to engage the inner ends of said tubular parts of each mounting member.

2. A wheel comprising a rim, mounting members arranged in angular spaced relation and extending substantially parallel with the wheel axis, a group of spokes comprising front and rear spokes crossing axially of each other and connecting each mounting member with the rim, the spokes of each group being arranged in angular relation to hold said mounting members in substantially predetermined angular spaced relation, a hub member engageable with corresponding ends of the mounting members, common means engageable with the other ends of the mounting members for holding the same in fixed relation to each other, and means for detachably securing said mounting members upon the hub member.

3. A wheel, comprising a rim, a plurality of tubular mounting members extending substantially parallel with the wheel axis, each mounting member comprising a pair of tubular parts in axial alignment, spokes connecting said rim and mounting members, bolts extending through said mounting members for securing the same to a hub member, and cooperating means upon said bolts and tubular parts for positioning the tubular parts with respect to each other.

4. A wheel comprising a rim, a plurality of tubular mounting members extending substantially parallel with the wheel axis, each tubular mounting member comprising a pair of opposed tubular end portions, one of which is exteriorly screw-threaded and a sleeve interiorly screw-threaded to engage said exteriorly screw-threaded member and arranged to abut the end of the other tubular member, spokes connecting said rim and mounting members, and bolts extending through said mounting members for securing the same to a hub member, said bolts having enlargements inclosed by said sleeves.

CHARLES S. ASH.